(12) United States Patent
Naiknaware

(10) Patent No.: US 9,735,730 B2
(45) Date of Patent: Aug. 15, 2017

(54) FLASH TESTING OF PHOTOVOLTAIC MODULES WITH INTEGRATED ELECTRONICS

(71) Applicant: SunPower Corporation, San Jose, CA (US)

(72) Inventor: Ravindranath Naiknaware, Portland, OR (US)

(73) Assignee: SunPower Corporation, San Jose, CA (US)

(*) Notice: Subject to any disclaimer, the term of this patent is extended or adjusted under 35 U.S.C. 154(b) by 327 days.

(21) Appl. No.: 14/663,976

(22) Filed: Mar. 20, 2015

(65) Prior Publication Data

US 2015/0194927 A1    Jul. 9, 2015

Related U.S. Application Data

(63) Continuation of application No. 13/300,362, filed on Nov. 18, 2011, now Pat. No. 8,988,096.

(60) Provisional application No. 61/449,695, filed on Mar. 6, 2011.

(51) Int. Cl.
| | |
|---|---|
| *H02S 50/10* | (2014.01) |
| *H01L 31/02* | (2006.01) |
| *H02S 50/15* | (2014.01) |
| *G01J 1/42* | (2006.01) |

(52) U.S. Cl.
CPC .............. *H02S 50/15* (2014.12); *G01J 1/42* (2013.01); *H02S 50/10* (2014.12); *G01J 2001/4266* (2013.01)

(58) Field of Classification Search
CPC .. H02S 50/10; H02S 50/15; G01J 1/42; G01J 2001/4266
See application file for complete search history.

(56) References Cited

U.S. PATENT DOCUMENTS

| | | |
|---|---|---|
| 6,791,024 B2 | 9/2004 | Toyomura |
| 8,138,782 B2 | 3/2012 | Elgar et al. |
| 8,988,096 B1 | 3/2015 | Naiknaware |
| 2005/0139258 A1 | 6/2005 | Liu et al. |
| 2008/0236648 A1 | 10/2008 | Klein et al. |
| 2009/0160259 A1 | 6/2009 | Naiknaware et al. |

(Continued)

OTHER PUBLICATIONS

Sinton et al. "Flash Testing High-Efficiency Silicon Solar Cells and Modules", 20th European Photovoltaic Solar Energy Conference, 2005, 4 pages.

(Continued)

*Primary Examiner* — Susan D Leong
(74) *Attorney, Agent, or Firm* — Boisbrun Hofman, PLLC

(57) ABSTRACT

A method for testing a photovoltaic (PV) module having an integrated power converter includes: obtaining a reference output signature of a PV module design in response to a flash pattern; applying the flash pattern to a PV module under test; acquiring an observed output signature of the PV module under test in response to the flash pattern; and comparing the observed output signature of the PV module under test to the reference output signature. Second reference output and observed output signatures may be obtained in response to a second flash pattern. The output signatures may be combined using various techniques. One or more parameters of the integrated power converter may be preset to one or more predetermined states prior to applying a flash pattern.

20 Claims, 11 Drawing Sheets

(56) References Cited

U.S. PATENT DOCUMENTS

| | | |
|---|---|---|
| 2009/0261810 A1 | 10/2009 | Askins et al. |
| 2009/0308426 A1 | 12/2009 | Kernahan |
| 2010/0066382 A1 | 3/2010 | Merkle |
| 2010/0073011 A1 | 3/2010 | Svidenko et al. |
| 2010/0264736 A1 | 10/2010 | Mumtaz et al. |
| 2010/0301991 A1 | 12/2010 | Sella |
| 2011/0273130 A1 | 11/2011 | Lee |
| 2012/0043818 A1 | 2/2012 | Stratakos et al. |
| 2012/0043923 A1 | 2/2012 | Ikriannikov et al. |
| 2012/0049635 A1 | 3/2012 | Schelenz et al. |
| 2012/0062265 A1 | 3/2012 | Chaintreuil et al. |
| 2012/0081088 A1* | 4/2012 | Park ............ H02J 7/345 323/282 |
| 2012/0161525 A1 | 6/2012 | Hong et al. |
| 2012/0176088 A1* | 7/2012 | Lee ............ H02J 3/383 320/128 |
| 2012/0215372 A1 | 8/2012 | Kernahan et al. |
| 2012/0223584 A1 | 9/2012 | Ledenev |
| 2012/0268087 A1 | 10/2012 | Kernahan |
| 2012/0274138 A1 | 11/2012 | Bundschuh et al. |

OTHER PUBLICATIONS

Sciencetech, "Large Area Flash Solar Simulator—1 m × 1 m", downloaded from Internet Mar. 6, 2011, 4 pages.
3 Rising Solar Equipment Co, Lid Module Simulator & Tester, downloaded from Internet Mar. 6, 2011, 2 pages.
Eikelboom et al., "Characterisation of PV Modules of New Generations—Results of tests and simulations," 2000, 14 pages.

\* cited by examiner

FLASH TESTING OF PHOTOVOLTAIC MODULES WITH INTEGRATED ELECTRONICS

CROSS-REFERENCE TO RELATED APPLICATIONS

This application is a Continuation of U.S. patent application Ser. No. 13/300,362 entitled "Flash Testing of Photovoltaic Modules with integrated Electronics" filed on Nov. 18, 2011, which claims priority from U.S. Provisional Patent Application Ser. No. 61/449,695 entitled Flash Testing of Photovoltaic Modules with Integrated Electronics filed Mar. 6, 2011.

BACKGROUND

Photovoltaic (PV) panels are fabricated with strings of PV cells connected in series to convert solar energy to electric power. In some cases the cells may be arranged as a combination of both parallel and series connections. During the manufacturing process, a variety of tests are used to determine adherence to stringent target specification tolerances on all mechanical as well as electrical aspects of the PV panels to ensure their long-term safety and reliability. These tests include a combination of visual, mechanical, optical and electrical techniques. For high-quality and high-speed manufacturing, many of these techniques are automated using computer vision, robotics and electronic instrumentation.

The electrical performance of a photovoltaic module depends on multiple factors. These factors include temperature, solar irradiance, angle-of-incidence, type of PV-cells, air mass, etc. FIG. 1 illustrates the current-voltage characteristic (I-V curve) of a typical PV panel under certain operating conditions. When the output terminals of the panel are shorted together, the output voltage (V) is zero, and the output current (I) is $I_{SC}$, which is the short-circuit current generated by the panel. As the output voltage increases, the I-V curve remains at a fairly constant level of current until it reaches a knee at which point it descends rapidly toward zero current at Voc, which is the open-circuit output voltage of the panel.

PV panels are rated under standard test conditions (STC) of solar irradiance of 1,000 W/m² with zero angle of incidence, solar spectrum of 1.5 air mass and 25° C. cell temperature. PV panels have traditionally been tested by exposing the panel to simulated sunlight under the standard test conditions and collecting enough data to construct an I-V curve. From this data, key specifications may be determined include maximum rated power, open circuit voltage, short circuit current, maximum power voltage, maximum power current, and temperature coefficients. However, standard techniques for exposing a PV panel and to 1,000 W/m² artificial illumination equivalent to sunlight may be prohibitively expensive, time consuming and in many cases impractical. For example, continuously exposing a PV panel to illumination at 1,000 W/m² may cause heating of the PV cells, thereby distorting the I-V characteristics to be measured for the determination of the panel performance at STC.

To eliminate the problems caused by continuous light sources, "flash" testing techniques have been developed. During flash testing of a PV module, a flash of light, typically 1 to 50 ms long, from a Xenon filled. (or equivalent) arc lamp is used, The spectral properties of the arc lamp are controlled to match the spectrum of the sunlight to the extent required. Alternate flash generation technologies can involve a variety of light sources including light-emitting diodes (LEDs). The output from the PV panel in response to the flash is collected by a data acquisition system and processed using a computer to determine the characteristic of the PV panel under test. The results are compared to the target specifications with appropriate tolerances to determine if the PV panel performs within the required specifications. Hash testing of PV panels is possible clue to the rapid-response of the photovoltaic cells, and limited charge accumulation and storage requirements before the IV characterization tests can be adequately performed.

PV panels have traditionally been manufactured as independent components that require external power conversion apparatus to optimize the operating point of the panel and/or to convert the DC power generated by the PV panel to AC power for connection to a local utility grid. PV panels are now being fabricated as modules with integral power converters. On a typical PV module with an integral power converter, only the output terminals of the power converter are accessible for testing. The output terminals of the PV cells are sealed to protect against environmental degradation.

Conventional flash testing cannot be used on. PV modules with fully integrated power converters such as power optimizers, AC microinverters and/or diagnostic and safety related communication capabilities for several reasons: (1) large inherent energy storage devices in power optimizers, AC microinverters and communication circuits; (2) large startup wattage requirements for allowing reliable startup of the module integrated electronics; (3) algorithmic latencies of maximum power point-tracking and digital control; and/or (4) connect and disconnect requirements as regulated by the standards and utilities.

DETAILED DESCRIPTION

Figure 1:
FIG. 1 illustrates the current-voltage characteristic (I-V curve) of a typical PV panel.
Figure 2:
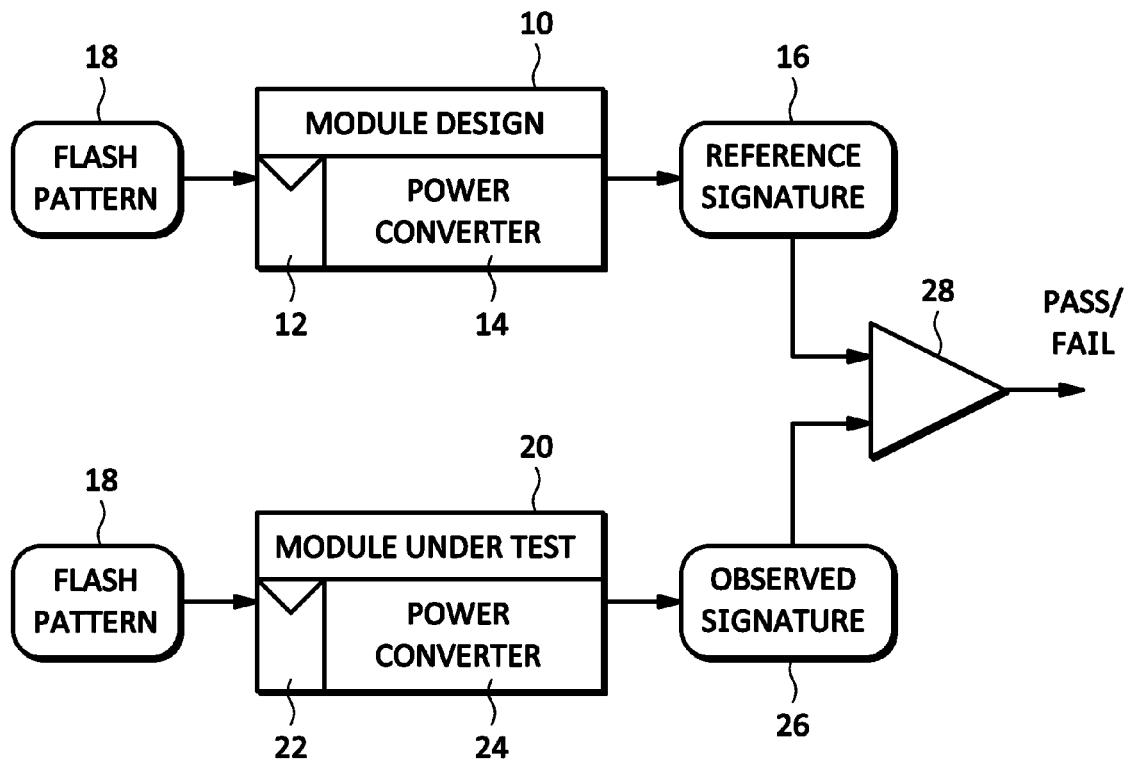
FIG. 2 illustrates an embodiment of a system for testing a PV module having an integral power converter according to some inventive principles of this patent disclosure.

FIG. 2 illustrates an embodiment of a system for testing a PV module having an integral power converter according to some inventive principles of this patent disclosure. A PV module design 10 includes an arrangement 12 of one or more PV cells and an integrated power converter 14 to process power from the arrangement of PV cells. A reference output signature 16 of the module design is obtained in response to a flash pattern 18.

The module design 10 may be embodied as a physical PV module, i.e., a known good embodiment of a design, in which case the reference output signature 16 may be obtained by observing the output of the module in response to a physical flash pattern 18 applied to the arrangement of PV cells on the module. Alternatively, the module design 10 may be a data construct in which case the reference output signature 16 may be obtained by simulating the output of the module in response to the flash pattern 18.

The signatures thus obtained from real measurement of a known-good module, or from a simulated data construct may only need to be obtained once. In practice, however, system calibration may need to be performed using alternate reference cells, or using the known-good modules much more often due to parametric variation of the system, e.g., to compensate for deterioration of luminescence of the arclamp or arc-flash sources with usage.

A physical module under test 20 includes an arrangement of PV cells 22 and integrated power converter 24 of the same design as the PV module design 10. The module 20 is tested by applying the same flash pattern 18 to the arrangement of PV cells 22 and acquiring an observed output signature 26 of the PV module under test in response to the flash pattern 18. The observed output signature 26 of the PV module under test is compared to the reference output signature 16 through suitable comparison logic 28 to determine if the observed output signature 26 of the module under test 20 is close enough to the reference output signature 16 to indicate whether the module under test falls within acceptable tolerances of the target specifications. The comparison logic may be implemented in hardware, software, firmware, etc., or any suitable combination thereof, and may include mathematical and statistical techniques to validate the module under test versus the reference signatures.

Figure 3:
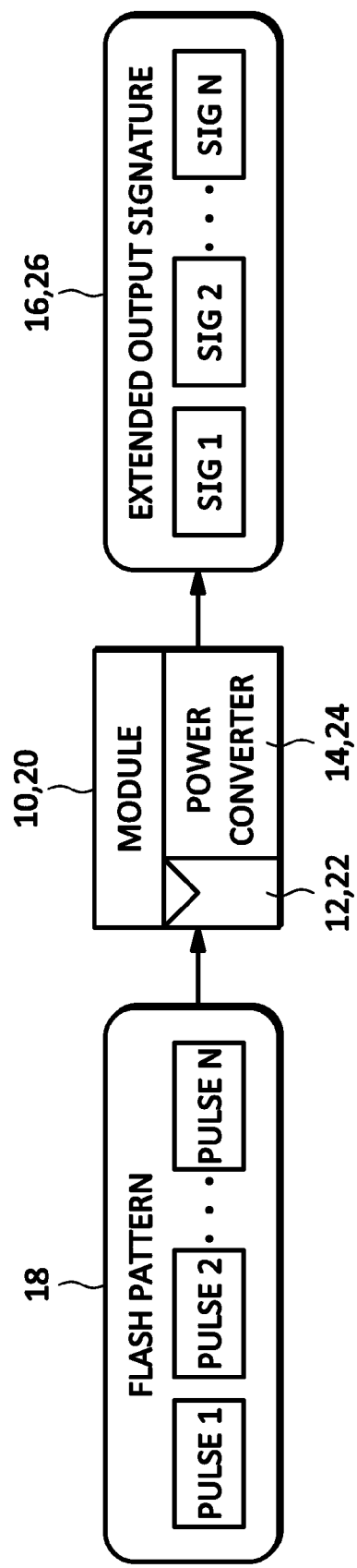
FIG. 3 illustrates a flash pattern having multiple pulses and an extended output signature according to some inventive principles of this patent disclosure.

The flash pattern 18 may consists of a single light pulse. Alternatively, as shown in FIG. 3, the flash pattern 18 may include multiple light pulses PULSE 1, PULSE 2 . . . PULSE N, in which case the reference output signature 16 and the observed output signature 26 may be extended output signatures which include multiple signatures SIG 1, SIG 2 . . . SIG N. The multiple light pulses may have different intensities and/or different pulse widths. They may be periodic in the sense that they begin or end at fixed time intervals, or the light pulses may occur at irregular intervals.

The flash pattern may be generated with a flash lamp wherein each light pulse is generated by a single optical impulse from the lamp. Alternatively, the flash pattern may be generated by using a shutter arrangement with a continuously operating lamp, such as a Xenon short art lamp.

FIGS. 4-7 illustrate some example flash patterns and corresponding output signatures for PV modules having integral power converters according to some inventive principles of this patent disclosure.

Figure 4:
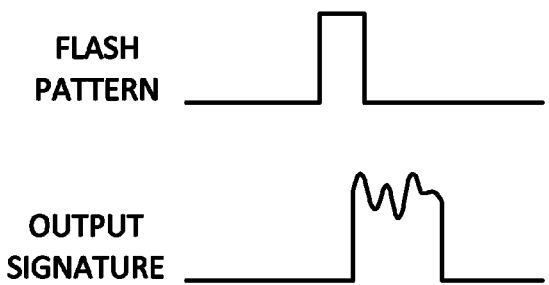
FIGS. 4-7 illustrate some example flash patterns and corresponding output signatures for PV modules having integral power converters according to some inventive principles of this patent disclosure.

FIG. 4 illustrates an example flash pattern having a single pulse and a corresponding output signature. This output signature, as well as those shown in FIGS. 5-7, are shown generically but may include implicit characterizations of charge times for input capacitors, start-up sequences for microcontrollers, rise times for inductors, on-state resistances for switching transistors, and other parameters as described in more detail below.

Figure 5:
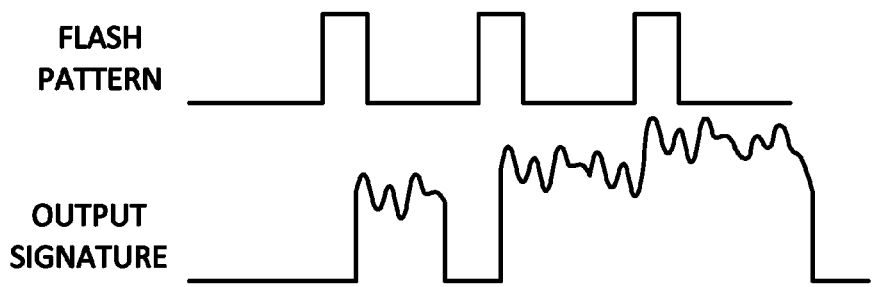

FIG. 5 illustrates an example flash pattern and corresponding output signature of light pulses having uniform intensity and width and occurring at uniform, i.e., periodic, intervals.

Figure 6:
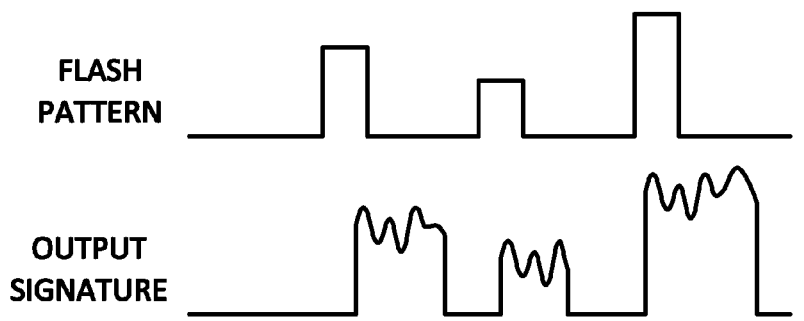

FIG. 6 illustrates an example flash pattern and corresponding output signature of light pulses having different intensities, but uniform width and intervals.

Figure 7:
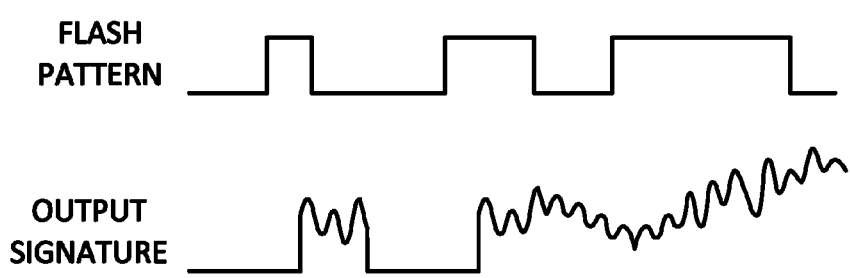

FIG. 7 illustrates an example flash pattern and corresponding output signature of light pulses having uniform intensity, but varying widths and spacing.

The patterns illustrated in FIGS. 4-7 are just a few examples for purposes of illustration. Countless other patterns and combinations of patterns may be implemented according to the inventive principles of this patent disclosure. For example, a flash pattern may also include multiple pulses having varying intensity and non-uniform durations between pulses.

Whereas prior art techniques for flash testing of PV panels obtain explicit I-V characteristics of the arrangement of PV cells on the panel, the output signatures acquired during testing of a PV module having an integral power converter according to the inventive principles of this patent disclosure may provide an implicit characterization of the I-V characteristics of the PV cells. Moreover, the output signatures may also include implicit characterizations of the integral power converter including initial charging of energy storage devices, startup wattage criterion, algorithmic latencies, etc. Thus, the inventive principles may enable the testing of the operation of all of the components of a PV module even though the output terminals of the PV cells may not be accessible. That is, opto-impulse electronic time signatures may be used in which, for a typical optical impulse from an arc lamp to a PV module with integrated electronics, all signals at the observable nodes are sampled using a high-speed data acquisition system. The signatures from multiple periodic and non-periodic flash exposures as described above may be referred to as multi-opto-impulse extended signatures.

In the embodiments described above and below, the output signatures would typically include voltage and/or current measurements taken from the output terminals of a power optimizer, microinverter, or any other form the integral power converter may take. However, the output signatures may include any other parameter that provides an indication of the compliance of the module under test with manufacturing tolerances. The output signatures may be obtained with any suitable load applied to the power converter running the entire range from open circuit to short circuit. Moreover, the load or loads may be changed to any suitable levels at different times during the test procedures. For example, in the embodiments of FIGS. 5-7, a different load may be applied to the integral power converter before, during or after each successive light pulse. In general, the load can be active or passive and may able to act as a source or sink. Furthermore, the active or passive load system may be synchronized with the flash generation system.

Figure 8:
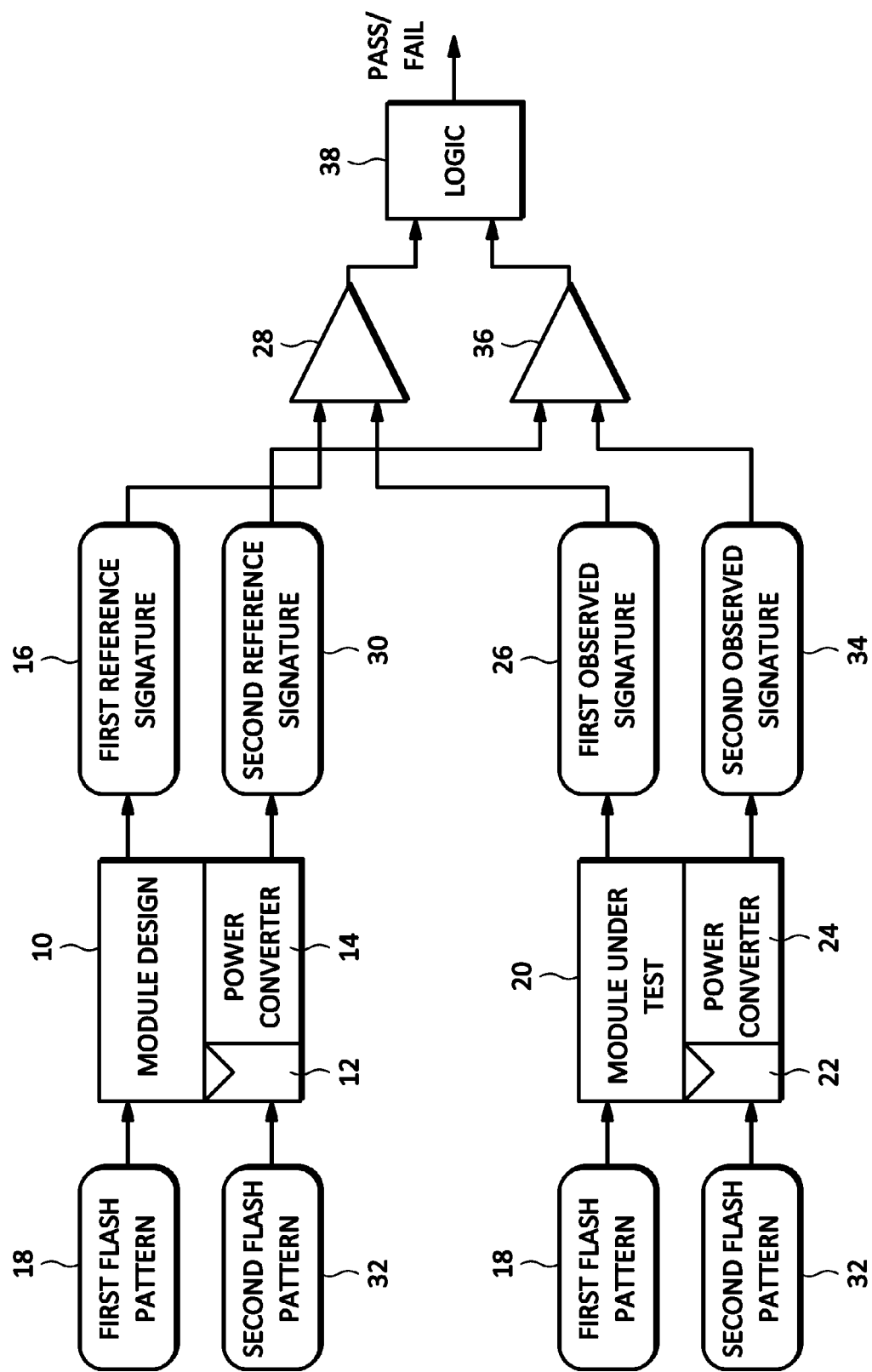
FIG. 8 illustrates another embodiment of a system for testing a PV module having an integral power converter according to some inventive principles of this patent disclosure.

FIG. 8 illustrates another embodiment of a system for testing a PV module having an integral power converter according to some inventive principles of this patent disclosure. The embodiment of FIG. 8 includes the same elements as the embodiment of FIG. 2, but in the embodiment of FIG. 8, a second reference output signature 30 for the module design 10 is obtained in response to a second flash pattern 32. During testing, the second flash pattern 32 is applied to the PV module under test 20, and a second observed output signature 34 of the PV module under test 20 is acquired in response to the second flash pattern 32.

The second observed output signature 34 is compared to the second reference output signature 30 through comparison logic 36. As in the embodiment of FIG. 2, the first observed output signature 26 is compared to the first reference output signature 16 through comparison logic 28. The outputs from comparison logic 28 and 36 may then be further processed through additional comparison and/or decision making logic 38 to determine whether the module under test falls within acceptable tolerances of the target specifications.

As with other embodiments, the module design 10 may be a physical or simulated embodiment, the reference output signatures may be obtained through simulation or observation of a known good module, any of the logic may be implemented with hardware, software, firmware, or any suitable combination thereof, etc.

Figure 9:
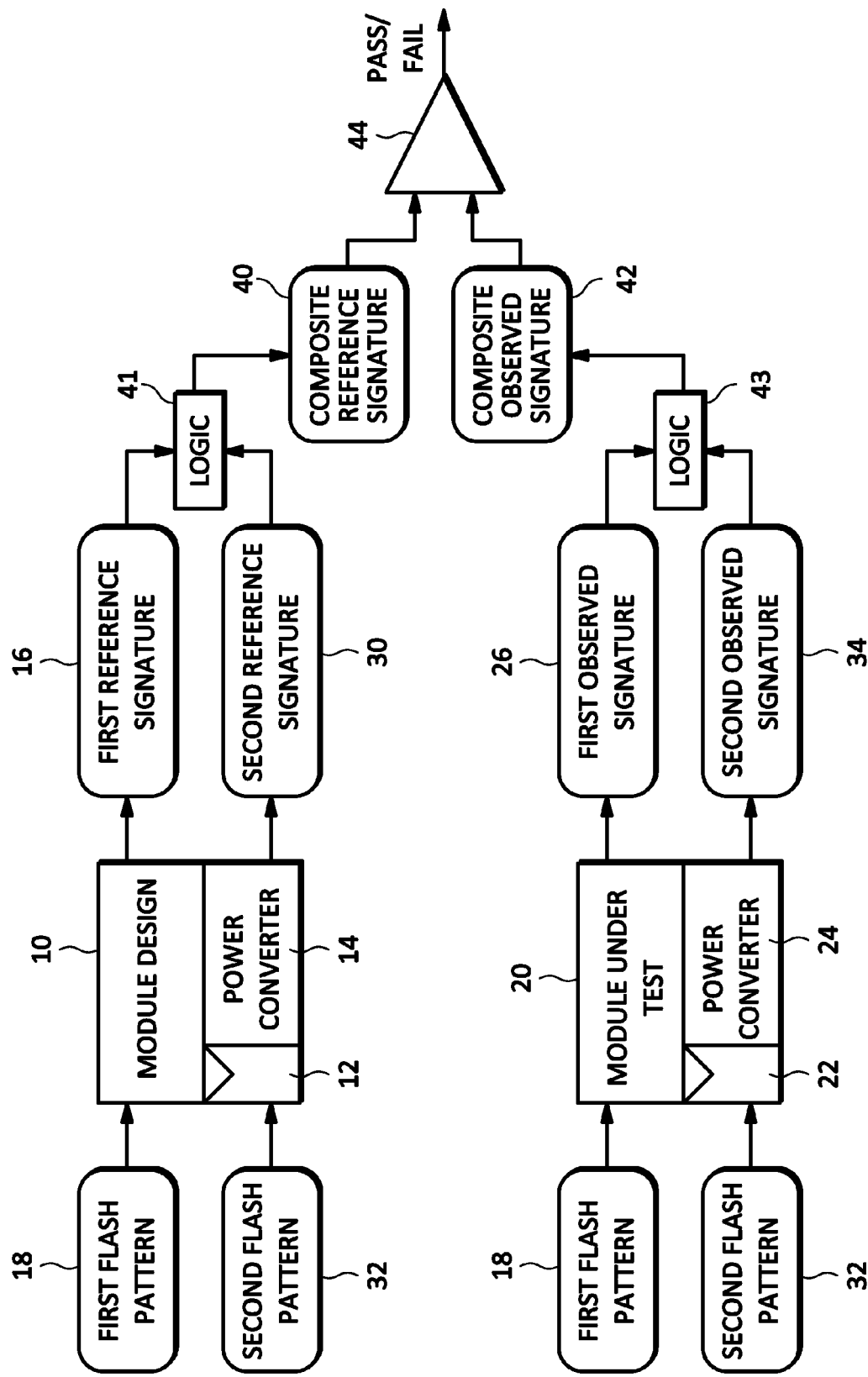
FIG. 9 illustrates another embodiment of a system for testing a PV module having an integral power converter according to some inventive principles of this patent disclosure.

FIG. 9 illustrates another embodiment of a system for testing a PV module having an integral power converter according to some inventive principles of this patent disclosure. The embodiment of FIG. 9 is similar to that of FIG. 8, but rather than comparing the individual observed output signatures to their respective reference output signatures, the first and second reference output signatures are combined by logic 41 to generate a composite reference output signature 40, and the first and second observed output signatures are combined by logic 43 to generate a composite observed output signature 42. The composite observed output signature 42 is then compared to the composite reference output signature 40 with comparison logic 44 to determine whether the module under test falls within acceptable tolerances.

The individual output signatures may be combined to generate composite output signatures using time domain techniques, frequency domain techniques, time-frequency domain techniques or any other suitable technique.

Figure 10:
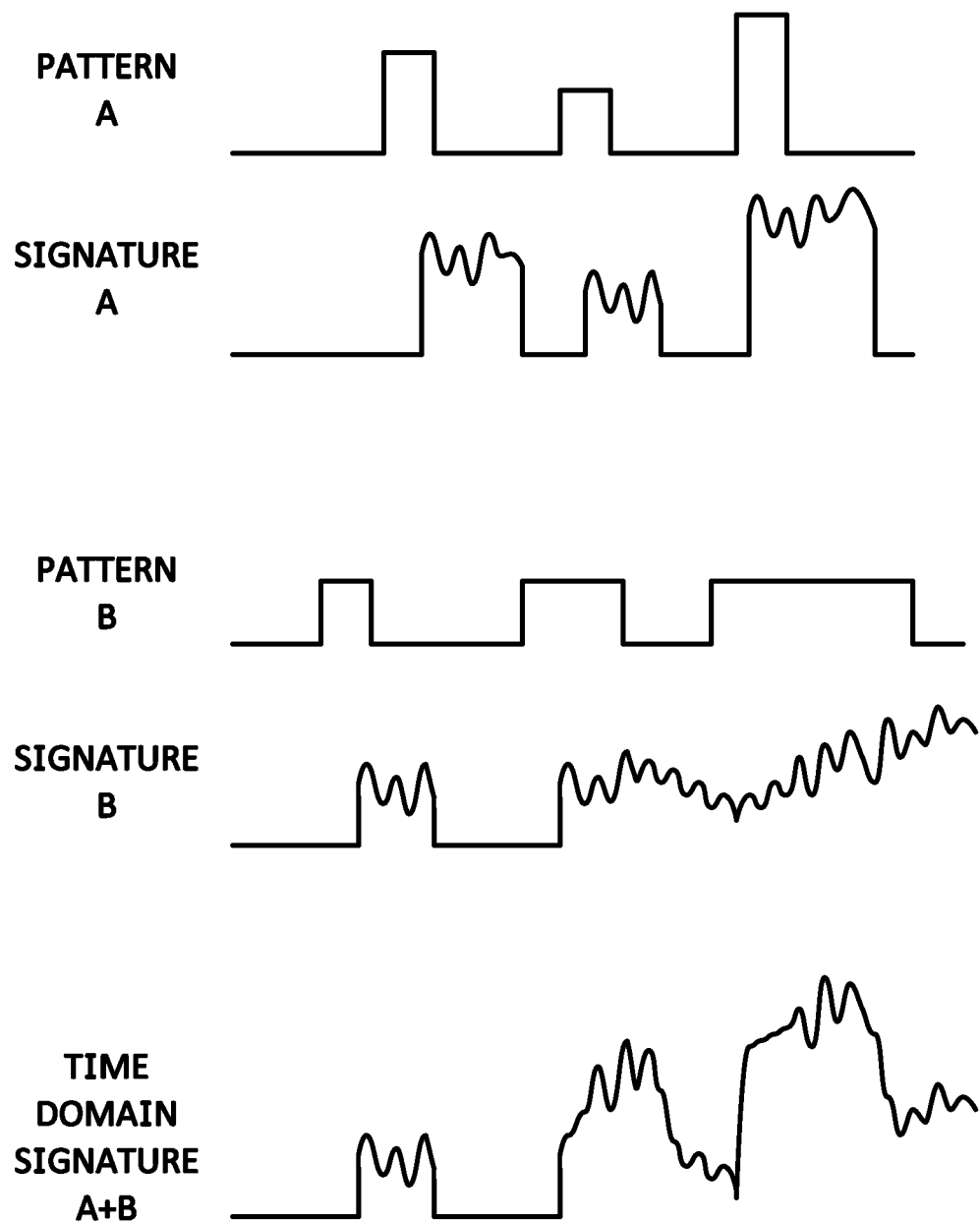
FIG. 10 illustrates an example embodiment of a test method in which to flash patterns are applied to a module design and/or module under test according to some inventive principles of this patent disclosure.

FIG. 10 illustrates an example embodiment of a test method in which flash patterns A and B are applied to a module design and/or module under test to generate extended output signatures A and B which are shown as generic waveforms for purposes of illustration. The extended output signatures A and B may be combined in the time domain as shown in FIG. 10. The combined extended output signatures may be adequate to characterize the response of the module under test, especially with modules that exhibit high levels of linearity.

Figure 11:
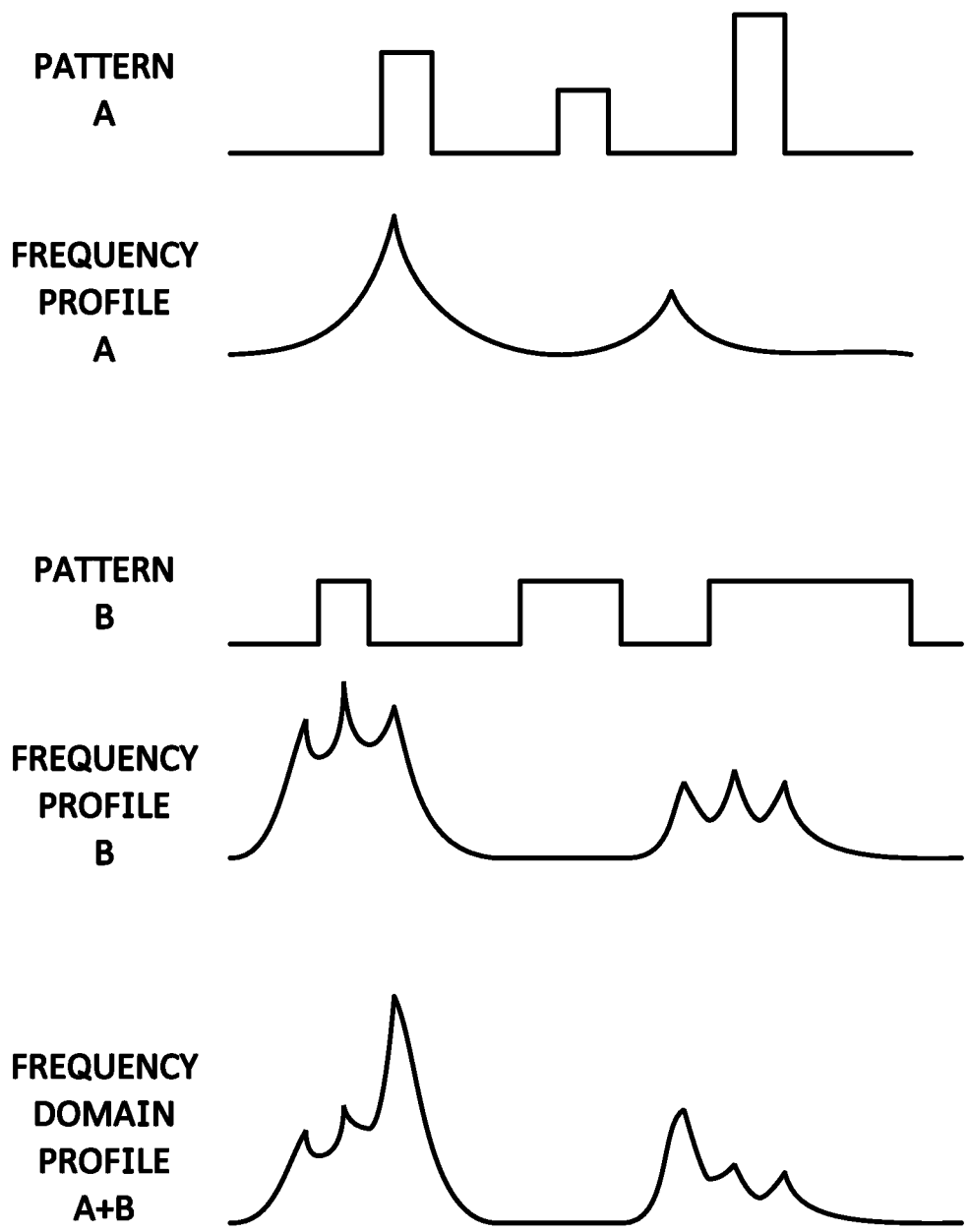
FIG. 11 illustrates an embodiment in which extended output signatures are combined in the frequency domain according to some inventive principles of this patent disclosure.

Alternatively, the extended output signatures A and B may be combined in the frequency domain as shown in FIG. 11, where each of the extended output signatures are transformed to the frequency domain, shown here as generic spectral profiles. The spectral profiles may then be added to generate a combined spectral profile. The frequency domain approach may enable the verification of operating characteristics of modules under test that may be difficult or impossible to recognize using time domain combination, especially with modules that exhibit high levels of nonlinearity.

Figure 12:
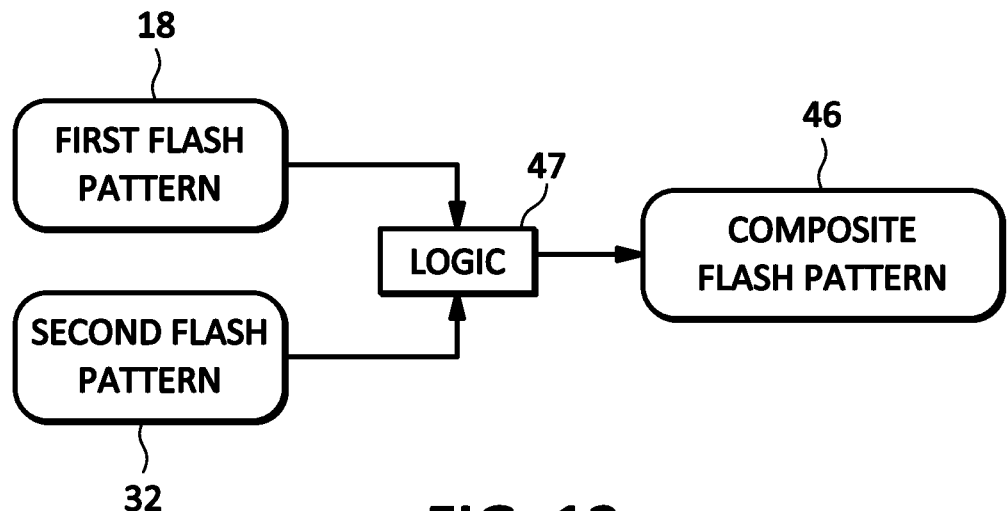
FIG. 12 illustrates an embodiment in which flash patterns are combined through addition in the time domain according to some inventive principles of this patent disclosure.
Figure 13:
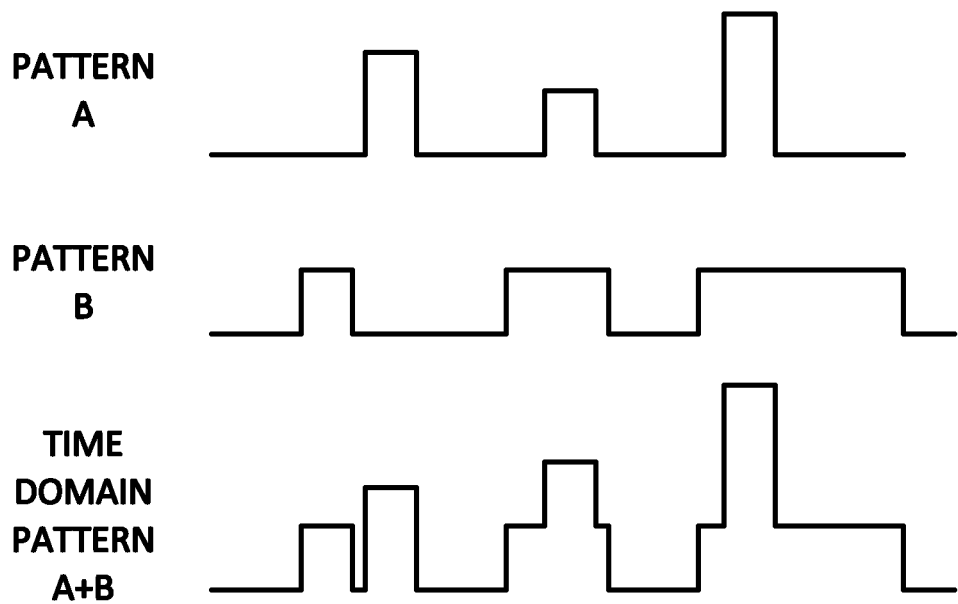
FIG. 13 illustrates an embodiment in which flash patterns are combined in the time domain according to some inventive principles of this patent disclosure.

The flash patterns may also be combined in any suitable manner. For example, FIG. 12 illustrates an embodiment in which first and second flash patterns 18 and 32 are combined by logic 47 through addition in the time domain to generate a composite flash pattern 46 which may then be applied to a module design or module under test, and the resulting signature analyzed in the time and/or frequency domain or other suitable method. FIG. 13 illustrates an example embodiment in which first flash pattern A and second flash pattern B are combined in the time domain to generate a composite flash pattern A+B.

The flash patterns may be physically combined in any suitable manner. For example, a first pattern A may be generated with a first flash lamp, while a second pattern B may be generated simultaneously with a second flash lamp. Thus, there may be different time periods when the module under test is illuminated only by the first lamp, only by the second lamp, or by both lamps at the same time. Alternatively, a single flash lamp may be used to generate the composite pattern by operating at a first radiance level when only pattern A is active, a second radiance level when only pattern B is active, and a third level when patterns A and B are both active.

Although the embodiments of FIGS. 8-13 are illustrated with only two different flash patterns, any suitable number of flash patterns may be used in accordance with the inventive principles of this patent disclosure. Moreover, one or more sub-sets of techniques, signatures and/or flash patterns may be locally determined to optimize test coverage with a minimum of equipment and test time during manufacture of modules having integral power converters according to the inventive principles of this patent disclosure.

As a further enhancement, signatures may be obtained and acquired by shadowing portions of the arrangements of PV cells using shadow patterns having various shapes and transparencies. For example, first reference and observed signatures may be obtained and acquired in response to a first flash pattern with no shadowing of the module design or module under test. Second reference and observed signatures may then be obtained and acquired in response to a second flash pattern with a predetermined shadowing pattern applied to the module design and module under test. The first and second flash patterns may be the same or different. The observed signatures may then be compared to the corresponding reference signatures as, for example, in the embodiment of FIG. 8 described above. Alternatively, the signatures may be combined to generate composite signatures prior to comparison, for example, as shown in the embodiment of FIG. 9.

Figure 14A:
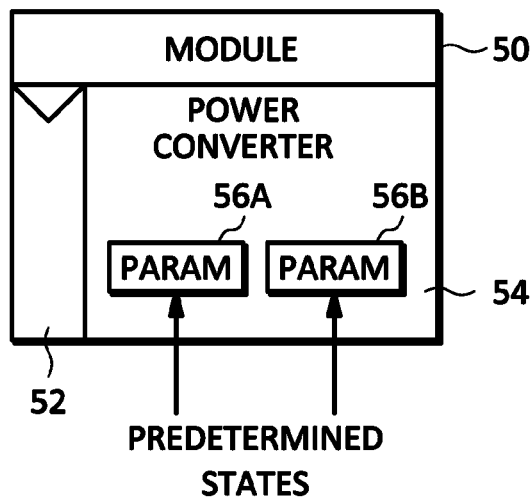
FIGS. 14A through 14C illustrate another method and apparatus for testing a PV module having an integrated power converter according to some inventive principles of this patent disclosure.
Figure 14B:
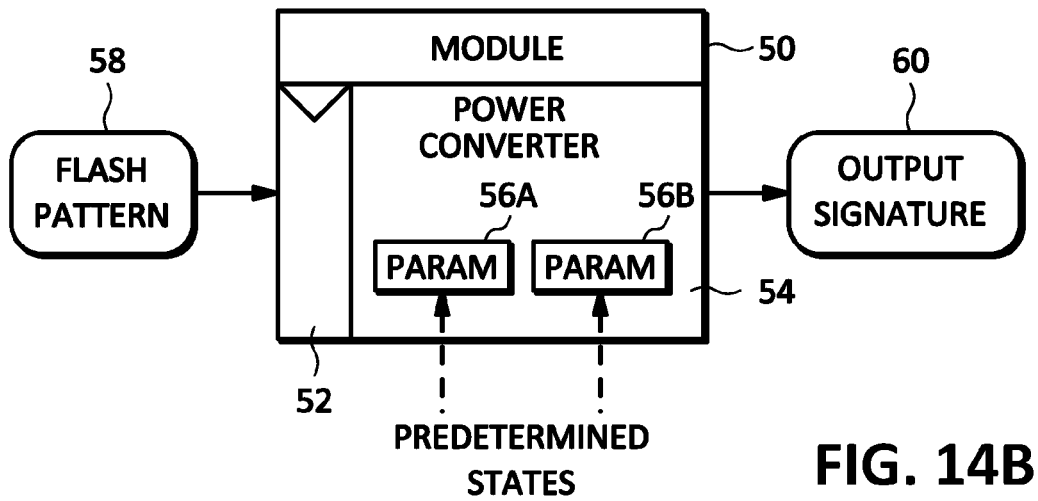
Figure 14C:
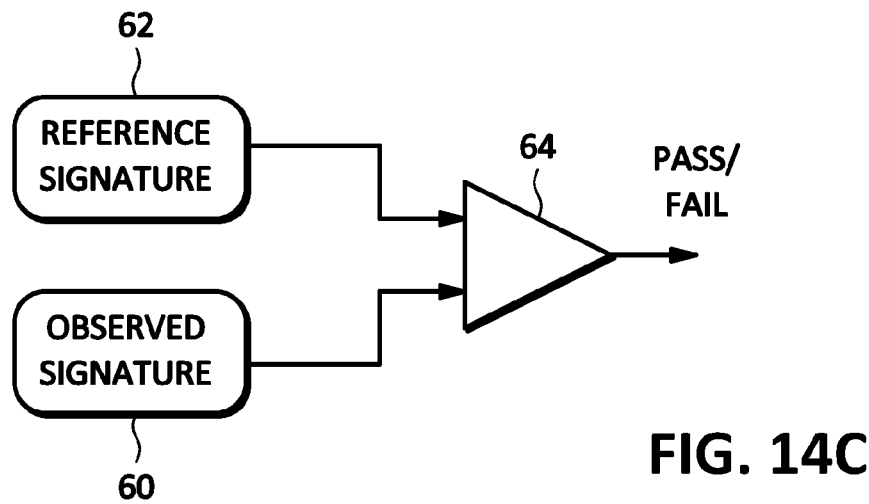

FIGS. 14A through 14C illustrate another method and apparatus for testing a PV module having an integrated power converter according to some inventive principles of this patent disclosure. Referring to FIG. 14A, a PV module under test 50 includes an arrangement of PV cells 52 and an integrated power converter 54 to process power from the cells. The power converter 54 includes one or more parameters 56A, 56B that are preset to predetermined states prior to application of a flash pattern. The parameters may include node voltages, bias currents, logic states, power supply states, and any other parameters that, by presetting them to predetermined states, may facilitate the generation of an output signature that is useful for evaluating a module under test in response to one or more flash patterns.

Referring to FIG. 14B, a flash pattern 58 is applied to the module under test 50, and an observed output signature 60 of the PV module under test is acquired in response to the flash pattern. The presetting of the parameters to predetermined states is now shown in broken lines to indicate that the parameters may be released prior to applying the flash pattern, or may be maintained in the predetermined states during the application of all or part of the flash pattern.

The method and apparatus described so far in the context of FIGS. 14A and 14B relate to a module under test, but the same or similar method and apparatus may be used to obtain a reference output signature for a corresponding module design, either by simulation or by applying the flash pattern to an actual known good module.

Referring to FIG. 14C, the observed output signature 60 of the PV module under test is compared to the reference output signature 62 through suitable comparison logic 64 to determine whether the module under test falls within acceptable tolerances of the target specifications.

Figure 15:
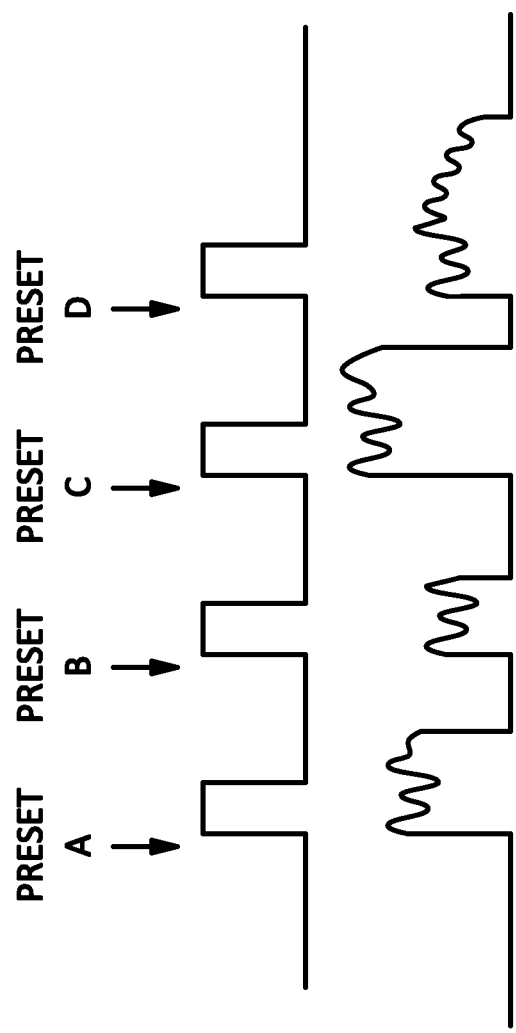
FIG. 15 illustrates how different preset patterns may be applied to the parameters of an integrated power converter according to some inventive principles of this patent disclosure.

The flash pattern 58 may include multiple light pulses, in which case the reference output signature and the observed output signature may include extended output signatures. The one or more parameters 56A, 56B may be preset a first time before a first one of the light pulses and may be preset a second time before a second one of the light pulses. For example, as shown in FIG. 15, different preset patterns A, B, C and D may be applied to the parameters before each of the multiple light pulses which generate the output signature shown in FIG. 15.

Figure 16:
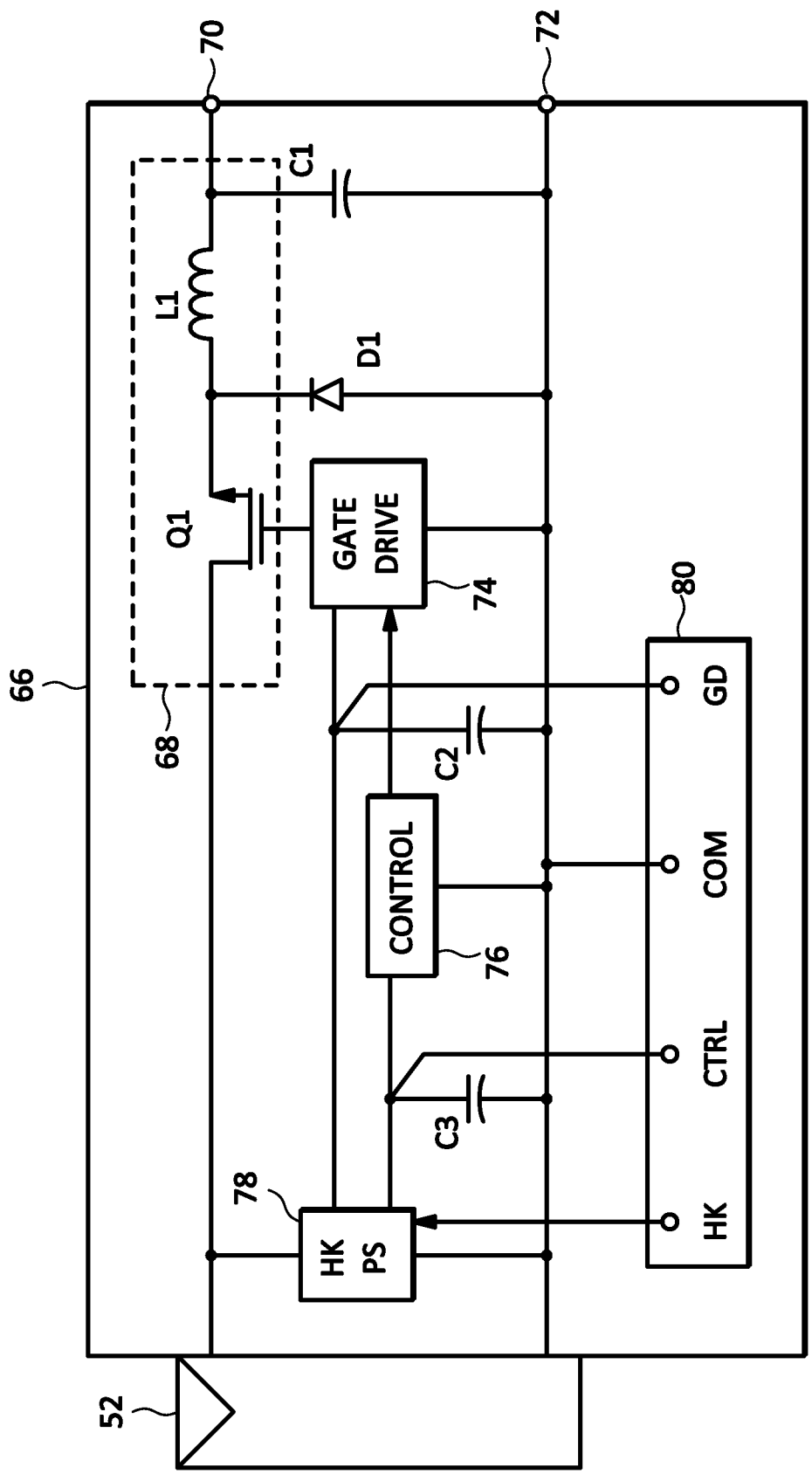
FIG. 16 illustrates an example embodiment of a PV module having an integrated power converter according to some inventive principles of this patent disclosure.

FIG. 16 illustrates an example embodiment of a PV module having an integrated power converter 66 according to some inventive principles of this patent disclosure. The power converter 66 includes a power train 68 having a power switch Q1 and an inductor L1 arranged in a buck configuration with a diode D1 and output capacitor C1. The power train 68 is arranged to convert power from the PV cells 52 to a different voltage and current at power output terminals 70 and 72, which are brought out to high-current terminals on the housing of the power converter 66.

The power converter also includes a gate drive circuit 74 to drive the switch Q1 in response to a controller 76. A house keeping power supply 78 taps a small amount of power from the PV cells 52 to provide operating power to the controller 76 and gate drive circuit 74.

A connector 80 provides access to certain nodes through the housing of the power controller. In this example, access is provided to a node COM at a common connection node, a node GD on capacitor C2 at the power supply input to the gate drive circuit 74, a node CTRL on capacitor C3 at the power supply input to the controller 76, and a node HK at an input to the house keeping power supply 78.

In one example implementation, capacitors C2 and C3 are precharged to normal operating levels through GD and CTRL while the house keeping power supply is bootstrapped through HK. Nodes GD and CTRL are then released just before the flash pattern is applied. This enables the power converter to operate normally without any latency when the flash is applied to the PV cells 52. In another example, the GD connection may be arranged to cause the gate drive to switch Q1 to always remain on thereby enabling the power train during the flash pattern to simulate, to the extent possible, the raw output from the PV cells 52 appearing at the power output terminals 70 and 72 through the switch Q1 and inductor L1.

In general, if the controller is implemented digitally, e.g., using a microcontroller, an additional digital interface may be included to preset digital states of the controller, thereby enabling easier testing of the entire PV Module.

The inventive principles of this patent disclosure have been described above with reference to some specific example embodiments, but these embodiments can be modified in arrangement and detail without departing from the inventive concepts. Such changes and modifications are considered to fall within the scope of the following claims.

What is claimed is:

1. A photovoltaic (PV) module, comprising:
   at least one PV cell;
   an integrated power converter configured to process power from said at least one PV cell and provide power at an output thereof; and
   an accessible node configured to enable a parameter of said integrated power converter to be preset to a predetermined state prior to application of a test flash pattern to said PV module.

2. The PV module as recited in claim 1 wherein said accessible node is separate from said output.

3. The PV module as recited in claim 1 wherein said parameter comprises at least one of a node voltage, a bias current, a logic state and a power converter state.

4. The PV module as recited in claim 1 wherein said parameter enables a housekeeping power supply in said integrated power converter.

5. The PV module as recited in claim 1 wherein said integrated power converter comprises a drive train configured to be enabled through said accessible node.

6. The PV module as recited in claim 1 wherein said accessible node is positioned on a connector of said integrated power converter.

7. The PV module as recited in claim 1 wherein said parameter is operable to be released prior to application of said test flash pattern.

8. The PV module as recited in claim 1 wherein said parameter is operable to be maintained in said predetermined state during application of said test flash pattern.

9. The PV module as recited in claim 1 further comprising a plurality of test flash patterns.

10. The PV module as recited in claim 9 wherein said parameter is preset to different predetermined states prior to application of said plurality of test flash patterns.

11. A method of operating a photovoltaic (PV) module, comprising:
    providing at least one PV cell;
    processing power from said at least one PV cell with an integrated power converter and providing power at an output thereof; and
    enabling a parameter of said integrated power converter via an accessible node to be preset to a predetermined state prior to application of a test flash pattern to said PV module.

12. The method as recited in claim 11 wherein said accessible node is separate from said output.

13. The method as recited in claim 11 wherein said parameter comprises at least one of a node voltage, a bias current, a logic state and a power converter state.

14. The method as recited in claim 11 further comprising enabling a housekeeping power supply in said integrated power converter.

15. The method as recited in claim 11 further comprising enabling a drive train of said integrated power converter.

16. The method as recited in claim 11 further comprising positioning said accessible node on a connector of said integrated power converter.

17. The method as recited in claim 11 further comprising releasing said parameter prior to application of said test flash pattern.

18. The method as recited in claim 11 further comprising maintaining said parameter in said predetermined state during application of said test flash pattern.

19. The method as recited in claim 11 further comprising a plurality of test flash patterns.

20. The method as recited in claim 19 further comprising enabling said parameter to be preset to different predetermined states prior to application of said plurality of test flash patterns.

* * * * *